(12) United States Patent
Miya

(10) Patent No.: US 8,619,376 B2
(45) Date of Patent: Dec. 31, 2013

(54) LENS SUPPORT FRAME

(71) Applicant: Hoya Corporation, Tokyo (JP)

(72) Inventor: Kota Miya, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/644,093

(22) Filed: Oct. 3, 2012

(65) Prior Publication Data

US 2013/0088790 A1     Apr. 11, 2013

(30) Foreign Application Priority Data

Oct. 11, 2011  (JP) ................................ 2011-223831

(51) Int. Cl.
*G02B 7/02*       (2006.01)

(52) U.S. Cl.
USPC .......... 359/811; 359/819; 359/820; 359/512; 359/694

(58) Field of Classification Search
USPC ......... 359/811, 819, 820, 512, 694–701, 738, 359/785; 348/47, 65, 157, E5.025; 396/349, 396/529
See application file for complete search history.

(56) References Cited

U.S. PATENT DOCUMENTS

| | | | |
|---|---|---|---|
| 5,894,369 A * | 4/1999 | Akiba et al. | 359/820 |
| 6,276,920 B1 * | 8/2001 | Doke et al. | 425/412 |
| 8,018,661 B2 * | 9/2011 | Ito | 359/696 |
| 8,184,380 B2 * | 5/2012 | Ito | 359/694 |

FOREIGN PATENT DOCUMENTS

JP          08-122603         5/1996

* cited by examiner

*Primary Examiner* — Loha Ben
(74) *Attorney, Agent, or Firm* — Greenblum & Bernstein P.L.C.

(57) ABSTRACT

A lens support frame includes an annular body portion; a large diameter lens holding groove on an inner peripheral surface of the body portion which is open on one side; a small diameter lens holding groove formed on an inner peripheral surface of the body portion and is open on the one side; and large-diameter-groove and small-diameter-groove lens-bonding depressions formed on inner peripheral surfaces of a large diameter lens holding groove and the small diameter lens holding groove, respectively, and allow an adhesive to be injected into the large-diameter-groove and small-diameter-groove lens-bonding depressions through end openings thereof on the one side, the end opening of the small-diameter-groove lens-bonding depression being communicatively connected with the large-diameter-groove lens-bonding depression. Circumferential positions of the large-diameter-groove and small-diameter-groove lens-bonding depressions are mutually different.

5 Claims, 4 Drawing Sheets

Related Art

LENS SUPPORT FRAME

BACKGROUND OF THE INVENTION

1. Field of the Invention

The present invention relates to a lens support frame which can be incorporated in an optical apparatus such as a camera.

2. Description of the Related Art

FIGS. 7 and 8 show a lens support frame 100 and three lens elements (a first lens element 107, a second lens element 108 and a third lens element 109), which are fixed to the inside of the lens support frame 100, that are provided as components of a lens barrel (photographic lens) of a compact digital camera.

The lens support frame 100 is provided, on an inner peripheral surface thereof, with a first lens holding groove 101, a second lens holding groove 102 and a third lens holding groove 103 which are formed as annular grooves and arranged in the forward/rearward direction. The first lens holding groove 101 is greater in diameter than the second lens holding groove 102, and the front ends of the first lens holding groove 101 and the second lens holding groove 102 are open. The third lens holding groove 103 is smaller in diameter than the second lens holding groove 102, and the rear end of third lens holding groove 103 is open.

Three lens-centering depressions 104 that are arc shaped as viewed from the front are formed on an inner peripheral surface of the first lens holding groove 101 at equi-angular intervals in a circumferential direction as portions depressed (recessed) radially outwards (double-headed arrows A shown in FIG. 7 show the formation areas of the lens-centering depressions 104). The front end of each lens-centering depression 104 is open and the rear end of each lens-centering recess 104 is closed.

In addition, three first lens-bonding depressions 105 that are arc shaped as viewed from the front are formed on an inner peripheral surface of the first lens holding groove 101 as portions recessed radially outwards. The first lens-bonding depressions 105 are formed at equi-angular intervals in a circumferential direction (double-headed arrows B shown in FIG. 7 show the formation areas of the first lens-bonding depressions 105), and the circumferential positions of the first lens-bonding depressions 105 are different from those of the lens-centering depressions 104 (namely, the first lens-bonding depressions 105 are not aligned with the lens-centering depressions 104 in the axial direction of the lens support frame 100, respectively). The front end of each first lens-bonding depression 105 is open and the rear end of each first lens-bonding recess 105 is closed.

Three second lens-bonding depressions 106 that are arc shaped as viewed from the front are formed on an inner peripheral surface of the second lens holding groove 102 at equi-angular intervals in a circumferential direction as portions recessed radially outwards (double-headed arrows C shown in FIG. 7 show the formation areas of the second lens-bonding depressions 106). The front end of each second lens-bonding depression 106 is open and the rear end of each second lens-bonding recess 106 is closed. As shown in the drawings, the three second lens-bonding depressions 106 are positioned immediately behind the three first lens-bonding depressions 105, respectively (namely, the circumferential positions of the three second lens-bonding depressions 106 are coincident with those of the three first lens-bonding depressions 105 as viewed from the front).

The second lens element 108, which is substantially identical in diameter to the second lens holding groove 102, is fixed to the second lens holding groove 102 by positioning the rim of the second lens element 108 in the second lens holding groove 102 from the front, thereafter injecting an adhesive into each second lens-bonding depression 106 from the front (from the front-end opening thereof), and curing the adhesive adhered to both the rim of the second lens element 108 and the inner surface of each second lens-bonding depression 106.

The first lens element 107, which is substantially identical in diameter to the first lens holding groove 101, is fixed to the first lens holding groove 101 after the second lens element 108 is fixed to the second lens holding groove 102. More specifically, after an operation to center the first lens element 107 is performed with a lens-centering tool (not shown) that is inserted into the lens-centering depressions 104 from the front (through the front-end openings of the lens-centering depressions 104) following an insertion of the rim of the first lens element 107 into the first lens holding groove 101 from the front, the first lens element 107 is fixed to the first lens holding groove 101 by injecting an adhesive into each first lens-bonding depression 105 from the front (from the front-end opening thereof) and curing the adhesive that is adhered to both the rim of the first lens element 107 and the inner surface of each first lens-bonding depression 105.

The third lens element 109, which is substantially identical in diameter to the third lens holding groove 103, is fixed to the third lens holding groove 103 by positioning the rim of the third lens element 109 in the third lens holding groove 103 from the rear, and thereafter thermally caulking the perimeter of the third lens holding groove 103 against the rim of the third lens element 109.

An example of the related art is disclosed in Japanese Patent Publication No. 3,442,507.

In general, the injection amount of adhesive into each first lens-bonding depression 105 and each second lens-bonding depression 106 is not so large as to completely fill the lens-bonding depressions 105 and 106, but is an amount (small amount) which fills only a part of the space of each lens-bonding depression 105 and 106. Therefore, even after the adhesive is cured (solidified), a void remains in a part of each lens-bonding depression 105 and 106.

Accordingly, in the case where the three second lens-bonding depressions 106 are positioned immediately behind the first lens-bonding depressions 105, respectively, like in the case of the lens support frame 100, the possibility of minute particles such as dust which have entered the first lens holding groove 101 from the front of the first lens element 107 through each of the three first lens-bonding depressions 105 entering in between the rear surface of the first lens element 107 and the front surface of the second lens element 108 through each of the three second lens-bonding depressions 106 that are respectively positioned immediately behind the three first lens-bonding depressions 105 increases.

If a large quantity of adhesive enough to fill the entire part of each second lens-bonding depression 106 is injected into each second lens-bonding depression 106 and is cured, each second lens-bonding depression 106 is completely filled with cured adhesive (since the second lens holding grooves 102 which do not have the three second lens-bonding depressions 106 are formed), so that dust can be prevented from entering in between the rear surface of the first lens element 107 and the front surface of the second lens element 108 through the three second lens-bonding depressions 106.

However, since gas is generated when an adhesive cures, the gas generated from the adhesive is trapped inside the space between the rear surface of the first lens element 107 and the front surface of the second lens element 108, thus causing the first lens element 107 and the second lens element 108 to fog if each second lens-bonding depression 106 is totally filled with adhesive. Accordingly, it is not preferable that an adhesive be injected into the entire part of each second lens-bonding depression 106.

SUMMARY OF THE INVENTION

The present invention provides a lens support frame which can effectively prevent minute dust particles from entering in between front and rear lens elements fixed to the lens support frame and can also prevent gas from being trapped therebetween while the front and rear lens elements can be securely fixed to the lens support frame with an adhesive.

According to an aspect of the present invention, a lens support frame is provided, including an annular body portion; a large-diameter-lens holding groove which is formed as an annular groove on an inner peripheral surface of the annular body portion, an end of the large-diameter-lens holding groove on one side in an axial direction, of the annular body portion, being open; a small-diameter-lens holding groove which is smaller in diameter than the large-diameter-lens holding groove and formed as an annular groove on an inner peripheral surface of the annular body portion at a position closer to the other side in the axial direction of the annular body portion than the large-diameter-lens holding groove, an end of the small-diameter-lens holding groove on the one side in the axial direction, of the annular body portion, being open; a large-diameter-groove lens-bonding depression which is formed on an inner peripheral surface of the large-diameter-lens holding groove and allows an adhesive which is to be adhered to an outer peripheral surface of a large-diameter lens element, which is fitted into the large-diameter-lens holding groove, to be injected into the large-diameter-groove lens-bonding depression through an end opening thereof on the one side; and a small-diameter-groove lens-bonding depression which is formed on an inner peripheral surface of the small-diameter-lens holding groove and allows an adhesive which is to be adhered to an outer peripheral surface of a small-diameter lens element, which is fitted into the small-diameter-lens holding groove, to be injected into the small-diameter-groove lens-bonding depression through an end opening thereof on the one side, the end opening of the small-diameter-groove lens-bonding depression being communicatively connected with the large-diameter-groove lens-bonding depression. A circumferential position of the large-diameter-groove lens-bonding depression and a circumferential position of the small-diameter-groove lens-bonding depression are mutually different as viewed in the axial direction.

It is desirable for the lens support frame to include a lens-centering depression which is formed on an inner peripheral surface of at least one of the large-diameter-lens holding groove and the small-diameter-lens holding groove at a different circumferential position from circumferential positions of the large-diameter-groove lens-bonding depression and the small-diameter-groove lens-bonding depression, wherein a lens-centering tool is insertable into the lens-centering depression through the end opening on the one side.

It is desirable for at least one of the large-diameter-groove lens-bonding depressions and the small-diameter-groove lens-bonding depressed portion to include a plurality of lens-bonding depressed portions arranged at equi-angular intervals in a circumferential direction.

It is desirable for circumferential positions of a plurality of the large-diameter-groove lens-bonding depressions to be different from circumferential positions of a plurality of the small-diameter-groove lens-bonding depressions.

In an embodiment, an annular lens support frame is provided, including a first lens holding groove in which a rim of a large-diameter lens element is fitted, wherein an end of the first lens holding groove on one side in an axial direction of the annular lens support frame is open; a second lens holding groove in which a rim of a small-diameter lens element is fitted, the second lens holding groove being smaller in diameter than the first lens holding groove and formed at a position closer to the other side in the axial direction of the annular lens support frame than the first holding groove, wherein an end of the second lens holding groove on the one side is open; a large-diameter-groove lens-bonding depression which is formed on an inner peripheral surface of the first lens holding groove and allows an adhesive, which is to be adhered to the rim of the large-diameter lens element, to be injected into the large-diameter-groove lens-bonding depression through an end opening thereof on the one side in the axial direction of the annular body portion; and a small-diameter-groove lens-bonding depression which is formed on an inner peripheral surface of the second lens holding groove and allows an adhesive, which is to be adhered to the rim of the small-diameter lens element, to be injected into the small-diameter-groove lens-bonding depression through an end opening thereof on the one side, the end opening of the small-diameter-groove lens-bonding depression being communicatively connected with the large-diameter-groove lens-bonding depression. A circumferential position of the large-diameter-groove lens-bonding depression and a circumferential position of the small-diameter-groove lens-bonding depression are mutually different.

According to the present invention, since the circumferential position of the small-diameter-groove lens-bonding depression is different from that of the large-diameter-groove lens-bonding depression as viewed in the axial direction of the lens support frame (namely, the small-diameter-groove lens-bonding depression is not aligned with the large-diameter-groove lens-bonding depression in the axial direction of the body portion), the possibility of minute particles such as dust which have entered the large-diameter-groove lens holding groove from the large-diameter lens element side through the large-diameter-groove lens-bonding depression reaching the small-diameter-groove lens-bonding depression is low. Therefore, there is little possibility of such dust entering in between the opposed surfaces of the large-diameter lens element and the small-diameter lens element through the small-diameter-groove lens-bonding depression.

In addition, since the small-diameter-groove lens-bonding depression does not have to be totally filled with adhesive, even if gas generated from the adhesive injected into the small-diameter-groove lens-bonding depression temporarily flows in between the opposed surfaces of the large-diameter lens element and the small-diameter lens element, this gas flows to the first lens holding groove side through the small-diameter-groove lens-bonding depression to be consequently discharged into an external space of the lens support frame through the large-diameter-groove lens-bonding depression. Therefore, there is substantially no chance of the gas remaining trapped between the large-diameter lens element and the small-diameter lens element and thus causing fogging of the large-diameter lens element or the small-diameter lens element.

The present disclosure relates to subject matter contained in Japanese Patent Application No. 2011-223831 (filed on Oct. 11, 2011) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
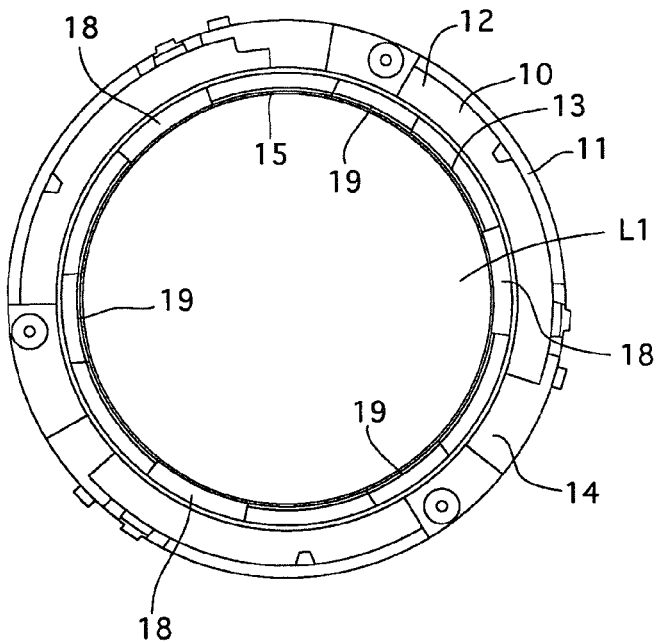
FIG. 1 is a front elevational view of an embodiment of a lens support frame according to the present invention and a first lens element that is held by the lens support frame.

An embodiment according to the present invention will be hereinafter discussed with reference to FIGS. 1 through 6. In the following descriptions, forward and rearward directions are determined with reference to the directions of the double-headed arrows shown in FIGS. 3 through 6.

The lens support frame 10 that is formed as a single (integral) product made of synthetic resin is a component of a lens barrel (provided immediately in front of an image sensor (image pickup device)) of a compact digital camera (the overall shape thereof is not shown in the drawings). The lens support frame 10 is provided with an annular outer cylindrical portion 11, an annular front wall portion 12, and an annular inner cylindrical portion 13. The front wall portion 12 projects radially inwards from the front edge of the outer cylindrical portion 11. The inner cylindrical portion 13 extends rearward from the inner edge of the front wall portion 12 and is shorter in length in the forward/rearward direction than the outer cylindrical portion 11. The outer cylindrical portion 11, the front wall portion 12 and the inner cylindrical portion 13 are elements of an annular body portion 14 of the lens support frame 10.

The inner cylindrical portion 13 is provided, at the front end of an inner peripheral surface thereof, with a first lens holding groove (large-diameter-lens holding groove) 15 that is formed as an annular groove with its center on an optical axis O (which is the optical axis of a first lens element a second lens element L2 and a third lens element L3). The front end of the first lens holding groove 15 is open. In addition, the inner cylindrical portion 13 is provided on an inner peripheral surface thereof with a second lens holding groove (small-diameter-lens holding groove) 16 that is positioned immediately behind the first lens holding groove 15. The second lens holding groove 16 is an annular groove (with its center on the optical axis O) which is coaxial with the first lens holding groove 15 and smaller in diameter than the first lens holding groove 15, and the front end of the second lens holding groove 16 is open. Additionally, the annular inner cylindrical portion 13 is provided at the rear of an inner peripheral surface thereof with a third lens holding groove 17. The third lens holding groove 17 is an annular groove (with its center on the optical axis O) which is coaxial with the first lens holding groove 15 and the second lens holding groove 16 and smaller in diameter than the second lens holding groove 16, and the rear end of the third lens holding groove 17 is open.

Figure 2:
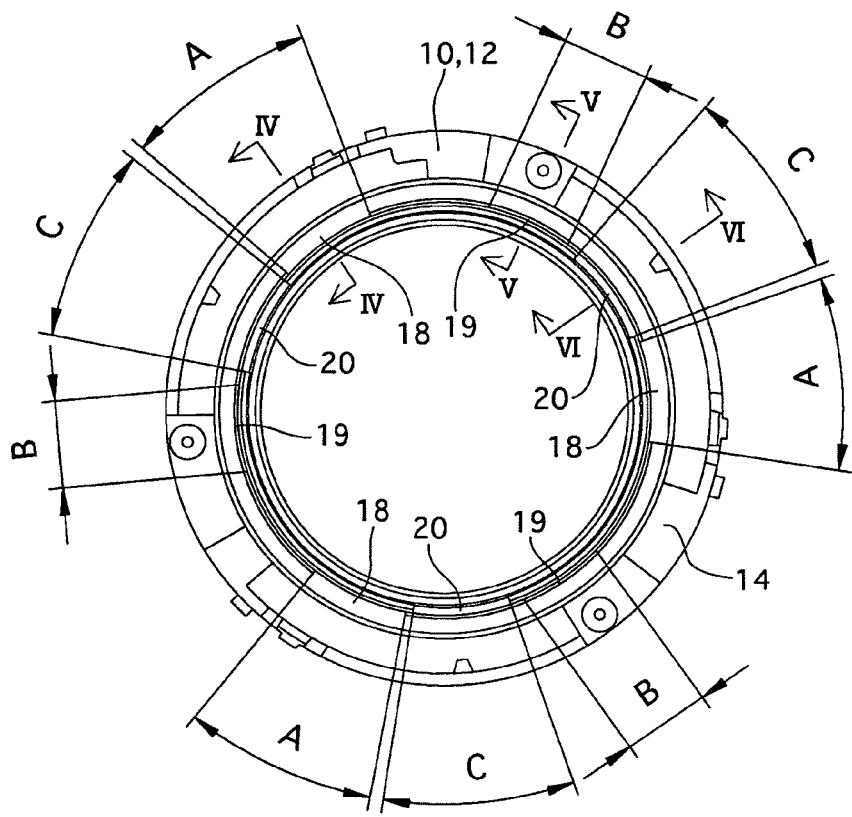
FIG. 2 is a front elevational view of the lens support frame from which the first lens element, a second lens element and a third lens element are removed.
Figure 3:
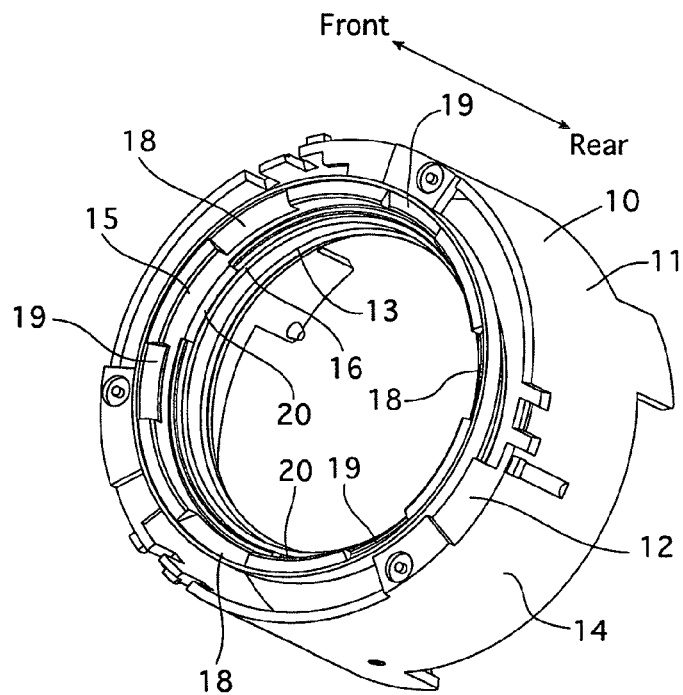
FIG. 3 is a perspective view of the lens support frame from which the first lens element, the second lens element and the third lens element are removed.
Figure 4:
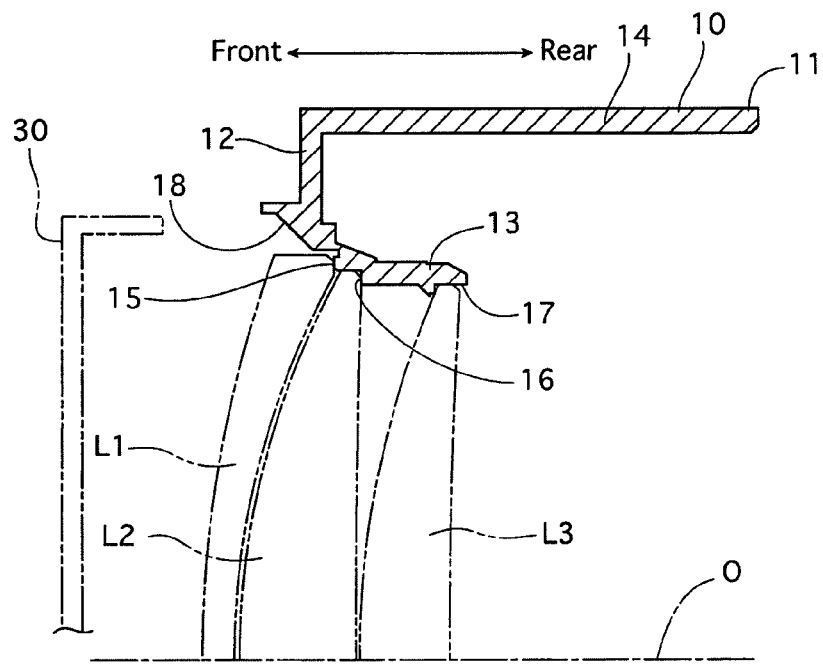
FIG. 4 is a cross sectional view taken along the line IV-IV line shown in FIG. 2.
Figure 5:
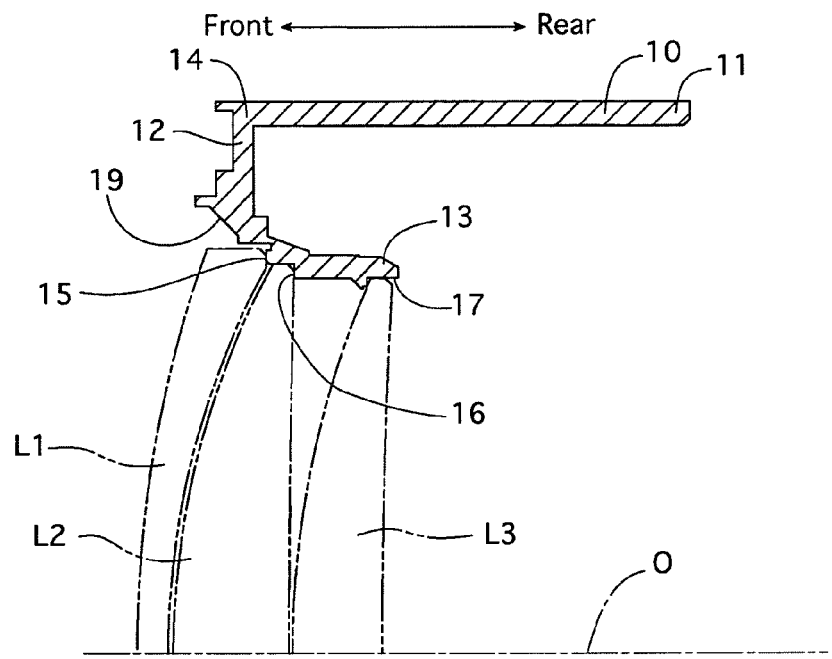
FIG. 5 is a cross sectional view taken along the line V-V line shown in FIG. 2.
Figure 6:
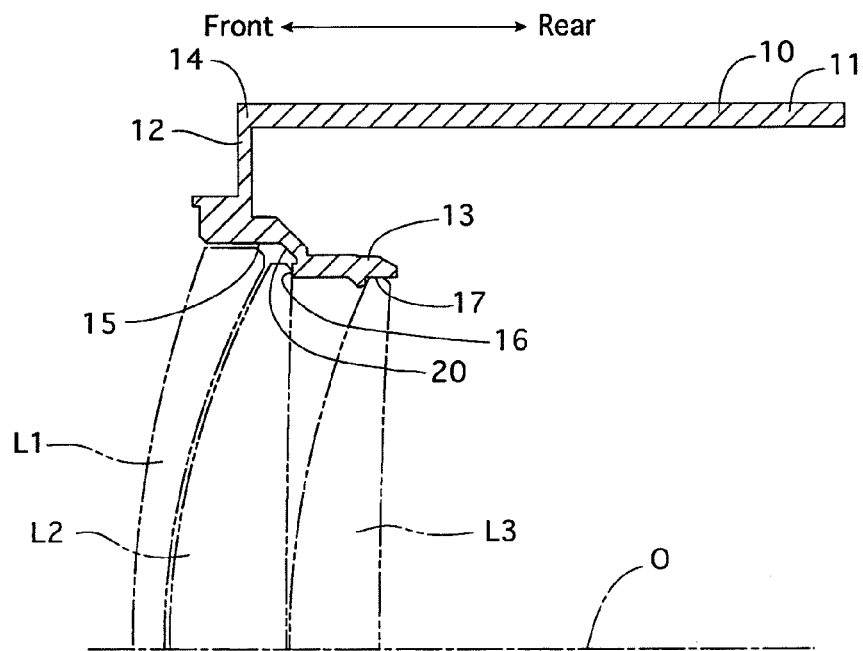
FIG. 6 is a cross sectional view taken along the line VI-VI line shown in FIG. 2.
Figure 7:
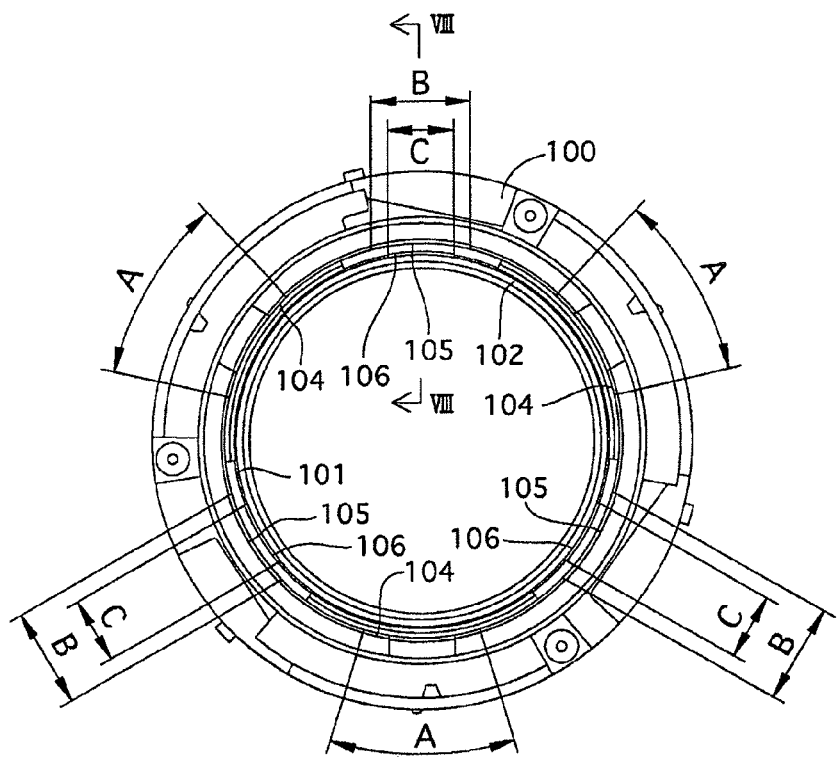
FIG. 7 is a front elevational view of a lens support frame, of the related art, from which a first lens element, a second lens element and a third lens element are removed.
Figure 8:
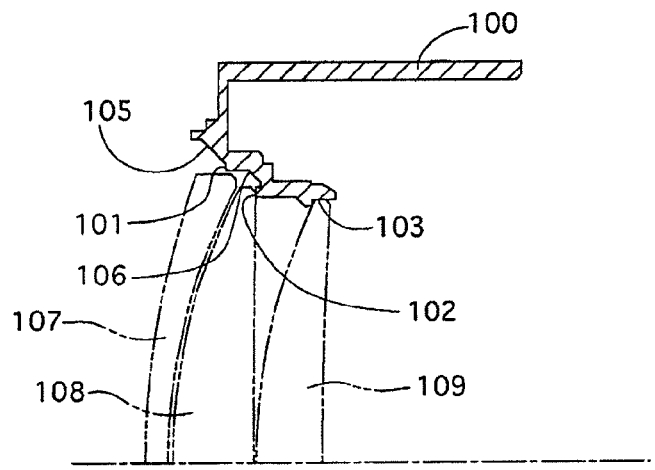
FIG. 8 is a cross sectional view taken along the line VIII-VIII line shown in FIG. 7.

As shown in the drawings, the lens support frame 10 is provided on an inner peripheral surface of the first lens holding groove 15 with three lens-centering depressions 18 which are each arc shaped as viewed from the front and are formed at equi-angular intervals in a circumferential direction as portions depressed (recessed) radially outwards (double-headed arrows A shown in FIG. 2 show the formation areas of the lens-centering depressions 18). The front end of each lens-centering depression 18 is open and the rear end of each lens-centering depression 18 is closed.

In addition, the lens support frame 10 is provided on an inner peripheral surface of the first lens holding groove with three first lens-bonding depressions (large-diameter-groove lens-bonding depressions) 19 which are each arc shaped as viewed from the front and are formed at equi-angular intervals in a circumferential direction as portions depressed radially outwards (double-headed arrows B shown in FIG. 2 show the formation areas of the first lens-bonding depressions 19), and the circumferential positions of the first lens-bonding depressions 19 are different from those of the lens-centering depressions 18 (namely, the first lens-bonding depressions 19 are not aligned with the lens-centering depressions 18 in the axial direction of the lens support frame 10, respectively). The front end and rear end of each first lens-bonding depression 19 are open and closed, respectively.

The lens support frame 10 is provided on an inner peripheral surface of the second lens holding groove 16 with three second lens-bonding depressions (small-diameter-groove lens-bonding depressions) 20 that are formed on an inner peripheral surface of the second lens holding groove 16 as portions depressed radially outwards. The second lens-bonding depressions 20 are formed at equi-angular intervals in a circumferential direction (double-headed arrows C shown in FIG. 2 show the formation areas of the second lens-bonding depressions 20). The rear end of each second lens-bonding depression 20 is closed, while the front end of each second lens-bonding depression 20 is open to be communicatively connected to the first lens holding groove 15. As shown in the drawings, the circumferential positions of the second lens-bonding depressions 20 are different from those of the lens-centering depressions 18 and the first lens-bonding depressions 19 (none of the second lens-bonding depressions 20 are positioned immediately behind the lens-centering depressions 18 or the first lens-bonding depressions 19). In other words, each second lens-bonding depression 20 is not aligned with any of the lens-centering depressions 18 or the first lens-bonding depressions 19 in the axial direction of the lens support frame 10.

A first lens element (large-diameter lens) L1, a second lens element (small-diameter lens) L2 and a third lens element L3, which are rotationally symmetrical transparent members arranged with their centers on the optical axis O, are fixed to the lens support frame 10 in a manner which will be discussed hereinafter.

The second lens element L2 that is substantially identical in diameter to the second lens holding groove 16 is fixed to the second lens holding groove 16 by positioning the rim of the second lens element L2 in the second lens holding groove 16 from the front, thereafter injecting a UV-cure adhesive (not shown) into each second lens-bonding depression 20 from the front (from the front-end opening thereof) and irradiating ultraviolet rays onto the aforementioned UV-cured adhesive that is adhered to both the rim of the second lens element L2 and the inner surface of each second lens-bonding depression 20 to cure the UV-cure adhesive. The injection volume of the aforementioned UV-cure adhesive into each second lens-bonding depression 20 is not great enough so as to totally fill each second lens-bonding depression 20, so that a void through which the first lens holding groove 15 and the second lens holding groove 16 are communicatively connected to each other remains in each second lens-bonding depression 20 after the UV-cure adhesive is cured (solidifies).

The first lens element L1 that is smaller in diameter than the inner peripheral surface of the first lens holding groove 15 (though greater in diameter than the second lens element L2) is fixed to the first lens holding groove 15 after the second lens element L2 is fixed to the second lens holding groove 16. More specifically, after the rim of the first lens element L1 is positioned in the first lens holding groove 15 from the front, a UV-cure adhesive (not shown) is injected into each first lens-bonding depression 19 from the front (from the front-end opening thereof) to hold the first lens element L1 provisionally by the UV-cure adhesive adhered to both the rim of the first lens element L1 and the inner surface of each first lens-bonding depression 19. Subsequently, a plurality of lugs of a lens-centering tool 30, the number of which is identical to the number of the lens-centering depressions 18, are inserted into the lens-centering depressions 18, respectively, from the front (from the front-end openings thereof), the rim of the first lens element L1 is held by the lugs of the lens-centering tool 30, and an eccentricity adjustment operation for the first lens element L1 is performed by radially pressing each lug of the lens-centering tool 30 with a lens-centering-tool 30 pressing member (not shown). After completion of this eccentricity adjustment operation, the first lens element L1 is fixed to the first lens holding groove 15 by irradiating ultraviolet rays (UV) to the UV-cured adhesive injected into each first lens-bonding depression 19 to cure the UV-cure adhesive. The injection volume of the aforementioned UV-cure adhesive into each first lens-bonding depression 19 is not great enough so as to totally fill each first lens-bonding depression 19, so that a void through which the first lens holding groove 15 and the space in front of the first lens-bonding depression 19 are communicatively connected to each other remains in each first lens-bonding depression 19 after the UV-cure adhesive is cured (solidifies).

The third lens element L3 that is substantially identical in diameter to the third lens holding groove 17 (though smaller in diameter than the second lens element L2) is fixed to the third lens holding groove 17 by positioning the rim of the third lens element L3 in the third lens holding groove 17 from the rear and thereafter thermally caulking the perimeter of the third lens holding groove 17 against the rim of the third lens element L3. The fixing operation for the third lens element L3 can be performed before or after the fixing operations for the first lens element L1 and the second lens element L2.

If the first lens element L1, the second lens element L2 and the third lens element L3 are fixed to the lens support frame 10 in the above described manner, there is a possibility of minute particles such as dust which exist in a space in front of the first lens element L1 entering the first lens holding groove 15 through the aforementioned spaces (not filled with adhesive) of the lens-centering depressions 18 or the first lens-bonding depressions 19. However, since the circumferential positions of the second lens-bonding depressions 20 are different from those of the lens-centering depressions 18 and the first lens-bonding depressions 19 as viewed from the front (none of the second lens-bonding depressions 20 are positioned immediately behind the lens-centering depressions 18 or the first lens-bonding depressions 19), the possibility of dust which enters the second lens holding groove 16 reaching any of the second lens-bonding depressions 20 is low. Therefore, there is little possibility of such dust entering in between the rear surface of the first lens element L1 and the front surface of the second lens element L2 through the second lens-bonding depressions 20.

Additionally, since each second lens-bonding depression 20 is not totally filled with an adhesive so that the aforementioned void remains in each second lens-bonding depression 20, even if the gas generated from the aforementioned adhesive injected into each second lens-bonding depression 20 temporarily flows in between the rear surface of the first lens element L1 and the front surface of the second lens element L2, this gas flows to the first lens holding groove 15 side through the aforementioned space of each second lens-bonding depression 20 to be consequently externally discharged from the lens support frame 10 through the three lens-centering depressions 18 and the three first lens-bonding depressions 19. Therefore, the gas does not remain trapped between the rear surface of the first lens element L1 and the front surface of the second lens element L2, thus no fogging of the first lens element L1 or the second lens element L2 occurs.

In the present embodiment of the lens support frame 10, even if each first lens-bonding depression 19 is totally filled with a large amount of UV-cure adhesive, the gas generated by the UV-cure adhesive is externally discharged from the lens support frame 10 through the first lens holding groove 15 and the three lens-centering depressions 18 due to the structure of the lens support frame 10, no problem arises even if a large amount of UV-cure adhesive is injected into each first lens-bonding depression 19.

Although the present invention has been described based on the above illustrated embodiment, making various modifications to the above illustrated embodiment is possible.

For instance, although the present invention has been applied to the first lens holding groove 15 and the second lens holding groove 16 in the above described embodiment, the present invention is applicable to another two (front and rear) lens holding grooves arranged side by side in the forward/rearward direction so long as the rear lens holding groove is smaller in diameter than the front lens holding groove (positioned immediately in front of the rear lens holding groove) and providing the front end of each lens holding groove is open (for instance, the second lens holding groove and the third lens holding groove can be made as a large-diameter-lens holding groove and a small-diameter-lens holding groove, respectively).

In addition, the present invention can be applied to three or more lens holding grooves (e.g., a first lens holding groove, a second lens holding groove and a third lens holding groove) which are arranged in the forward/rearward direction, wherein one lens holding groove is smaller in diameter than another lens holding groove which is positioned in front of (immediately in front of) the one lens holding groove (in this case, the circumferential positions of lens-bonding depressions which are formed in one of two lens holding grooves adjacent to each other in the forward/rearward direction and the circumferential positions of lens-centering depressions which are formed in the other of the two lens holding grooves are mutually different).

Additionally, the present invention can be applied to three or more lens holding grooves which are arranged in the forward/rearward direction, wherein the diameter of one lens holding groove is smaller than another lens holding groove which is positioned behind (immediately behind) the one lens holding groove. In this case, the rear ends of each lens holding groove, each lens-bonding depression and each lens-centering depression are formed as open ends, and the circumferential positions of lens-bonding depressions which are formed in one of two lens holding grooves adjacent to each other in the forward/rearward direction and the circumferential positions of lens-centering depressions which are formed in the other of the two lens holding grooves are mutually different.

Additionally, it is possible to form the lens-centering depressions 18 in a rear lens holding groove (that is greater in diameter than a rear lens which is to be mounted) to which the present invention is applied or to form the lens-centering depressions 18 in both front and rear lens holding grooves to which the present invention is applied. In this case also, the circumferential positions of the lens-centering depressions 18 formed in the front lens holding groove (i.e., the front set of lens-centering depressions 18), the circumferential positions of the lens-centering depressions 18 formed in the rear lens holding groove (i.e., the rear set of lens-centering depressions 18), the circumferential positions of the lens-bonding depressions formed in the front set of lens-centering depressions 18 and the circumferential positions of the lens-bonding depressions formed in the rear set of lens-centering depressions 18 are mutually different (namely, the circumferential positions of all the depressions are mutually different).

Additionally, an adhesive to be injected into each lens-bonding depression is not limited solely to an UV-cure adhesive, but can be a different type of adhesive.

The lens-centering depressions 18, the first lens-bonding depressions 19 and the second lens-bonding depressions 20 that are formed in the respective lens holding grooves can be one, two or more than three in number. In addition, the lens-centering depressions 18, the first lens-bonding depressions 19 and the second lens-bonding depressions 20 do not have to be arranged at equi-angular intervals in the case where the respective numbers thereof are more than one.

Additionally, the present invention can also be applied to a lens support frame of an optical apparatus other than a compact digital camera (e.g., a lens support frame of a lens barrel for use in an SLR camera, a lens barrel of a camera incorporated in a cellular phone or a personal digital assistant (PDA), or a lens support frame for an imaging optical system incorporated in an apparatus other than a camera, a cellular phone or a personal digital assistant).

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A lens support frame comprising:
    an annular body portion;
    a large-diameter-lens holding groove which is formed as an annular groove on an inner peripheral surface of said annular body portion, an end of said large-diameter-lens holding groove on one side in an axial direction, of said annular body portion, being open;
    a small-diameter-lens holding groove which is smaller in diameter than said large-diameter-lens holding groove and formed as an annular groove on an inner peripheral surface of said annular body portion at a position closer to the other side in said axial direction of said annular body portion than said large-diameter-lens holding groove, an end of said small-diameter-lens holding groove on said one side in said axial direction, of said annular body portion, being open;
    a large-diameter-groove lens-bonding depression which is formed on an inner peripheral surface of said large-diameter-lens holding groove and allows an adhesive which is to be adhered to an outer peripheral surface of a large-diameter lens element, which is fitted into said large-diameter-lens holding groove, to be injected into said large-diameter-groove lens-bonding depression through an end opening thereof on said one side; and
    a small-diameter-groove lens-bonding depression which is formed on an inner peripheral surface of said small-diameter-lens holding groove and allows an adhesive which is to be adhered to an outer peripheral surface of a small-diameter lens element, which is fitted into said small-diameter-lens holding groove, to be injected into said small-diameter-groove lens-bonding depression through an end opening thereof on said one side, said end opening of said small-diameter-groove lens-bonding depression being communicatively connected with said large-diameter-groove lens-bonding depression,
    wherein a circumferential position of said large-diameter-groove lens-bonding depression and a circumferential position of said small-diameter-groove lens-bonding depression are mutually different as viewed in said axial direction.

2. The lens support frame according to claim 1, further comprising a lens-centering depression which is formed on an inner peripheral surface of at least one of said large-diameter-lens holding groove and said small-diameter-lens holding groove at a different circumferential position from circumferential positions of said large-diameter-groove lens-bonding depression and said small-diameter-groove lens-bonding depression, wherein a lens-centering tool is insertable into said lens-centering depression through said end opening on said one side.

3. The lens support frame according to claim 1, wherein at least one of said large-diameter-groove lens-bonding depression and said small-diameter-groove lens-bonding depression comprises a plurality of lens-bonding depressed portions arranged at equi-angular intervals in a circumferential direction.

4. The lens support frame according to claim 1, wherein circumferential positions of a plurality of said large-diameter-groove lens-bonding depressions are different from circumferential positions of a plurality of said small-diameter-groove lens-bonding depressions.

5. An annular lens support frame comprising:
    a first lens holding groove in which a rim of a large-diameter lens element is fitted, wherein an end of said first lens holding groove on one side in an axial direction, of said annular lens support frame, is open;
    a second lens holding groove in which a rim of a small-diameter lens element is fitted, said second lens holding groove being smaller in diameter than said first lens holding groove and formed at a position closer to the other side in said axial direction of said annular lens support frame than said first holding groove, wherein an end of said second lens holding groove on said one side is open;
    a large-diameter-groove lens-bonding depression which is formed on an inner peripheral surface of said first lens holding groove and allows an adhesive, which is to be adhered to said rim of said large-diameter lens element, to be injected into said large-diameter-groove lens-bonding depression through an end opening thereof on said one side; and
    a small-diameter-groove lens-bonding depression which is formed on an inner peripheral surface of said second lens holding groove and allows an adhesive, which is to be adhered to said rim of said small-diameter lens element, to be injected into said small-diameter-groove lens-bonding depression through an end opening thereof on said one side, said end opening of said small-diameter-groove lens-bonding depression being communicatively connected with said large-diameter-groove lens-bonding depression, wherein a circumferential position of said large-diameter-groove lens-bonding depression and a circumferential position of said small-diameter-groove lens-bonding depression are mutually different as viewed in said axial direction.

* * * * *